(12) United States Patent
Fujii et al.

(10) Patent No.: US 6,420,061 B1
(45) Date of Patent: Jul. 16, 2002

(54) FUEL CELL STACK

(75) Inventors: Yosuke Fujii; Masaharu Suzuki; Narutoshi Sugita, all of Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/499,361

(22) Filed: Feb. 10, 2000

(30) Foreign Application Priority Data

Feb. 23, 1999 (JP) ............................................. 11-045378

(51) Int. Cl.[7] ................................................ H01M 8/02
(52) U.S. Cl. ............................... 429/26; 429/32; 429/34
(58) Field of Search ............................... 429/26, 32, 34, 429/38, 39

(56) References Cited

U.S. PATENT DOCUMENTS

| | | | | |
|---|---|---|---|---|
| 5,998,054 A | * | 12/1999 | Jones et al. | ................ 429/34 |
| 6,048,633 A | * | 4/2000 | Fujii et al. | ................ 429/32 |
| 6,099,984 A | * | 8/2000 | Rock | ................ 429/39 |
| 6,150,049 A | * | 11/2000 | Nelson et al. | ................ 429/39 |
| 6,251,534 B1 | * | 6/2001 | Mcelroy | ................ 429/34 X |
| 6,255,011 B1 | * | 7/2001 | Fujii et al. | ................ 429/32 |

FOREIGN PATENT DOCUMENTS

JP        09050819 A        2/1997        ............ H01M/8/02

* cited by examiner

Primary Examiner—Stephen Kalafut
(74) Attorney, Agent, or Firm—Lahive & Cockfield, LLP

(57) ABSTRACT

A first separator has its surface which is designed to have a rectangular configuration. A fuel gas flow passage for making communication between a fuel gas inlet and a fuel gas outlet is provided on the surface. The fuel gas flow passage is designed to have a meandering configuration so that it extends in a long side direction and it turns back on a short side to allow a fuel gas to flow in the direction of the gravity. Accordingly, it is possible to effectively shorten a size in the height direction, and it is possible to obtain desired power generation performance with a simple structure.

14 Claims, 5 Drawing Sheets

FUEL CELL STACK

BACKGROUND OF THE INVENTION

1. Field of the Invention

The present invention relates to a fuel cell stack comprising a plurality of fuel cell units each composed of an electrolyte interposed between an anode electrode and a cathode electrode, the plurality of fuel cell units being stacked with separators intervening therebetween.

2. Description of the Related Art

For example, the solid polymer electrolyte fuel cell comprises a fuel cell unit including an anode electrode and a cathode electrode disposed opposingly on both sides of an electrolyte composed of a polymer ion exchange membrane (cation exchange membrane), the fuel cell unit being interposed between separators. Usually, the fuel cell is used as a fuel cell stack comprising a predetermined number of the fuel cell units and a predetermined number of the separators which are stacked with each other.

In such a fuel cell, a fuel gas such as a gas principally containing hydrogen (hereinafter referred to as "hydrogen-containing gas"), which is supplied to the anode electrode, is converted into hydrogen ion on the catalyst electrode, and the ion is moved toward the cathode electrode via the electrolyte which is appropriately humidified. The electron, which is generated during this process, is extracted for an external circuit, and the electron is utilized as DC electric energy. An oxygen-containing gas such as a gas principally containing oxygen (hereinafter referred to as "oxygen-containing gas") or air is supplied to the cathode electrode. Therefore, the hydrogen ion, the electron, and the oxygen gas are reacted with each other on the cathode electrode, and thus water is produced.

In order to supply the fuel gas and the oxygen-containing gas to the anode electrode and the cathode electrode respectively, a porous layer having conductivity, for example, porous carbon paper is usually disposed on the catalyst electrode layer (electrode surface), and the porous layer is supported by the separator. Further, one or a plurality of gas flow passages designed to have a uniform widthwise dimension are provided on the mutually opposing surfaces of each of the separators.

In such an arrangement, the condensed water or the water produced by the reaction exists in a state of liquid (water) in the gas flow passages. If the water is accumulated in the porous layer, the diffusion performance is lowered concerning the diffusion of the fuel gas and the oxygen-containing gas to the catalyst electrode layer. It is feared that the cell performance is conspicuously deteriorated.

In view of this fact, for example, a solid polymer electrolyte type fuel cell is known, as disclosed in Japanese Laid-Open Patent Publication No. 9-50819, which makes it possible to remove water droplets adhered to the wall surface of the flow passage groove provided on the separator for allowing the fuel gas and the oxygen-containing gas to flow. Specifically, as shown in FIG. 5, the separator 1 comprises through-holes 2a, 2b for the oxygen-containing gas, through-holes 3a, 3b for the heat medium, and through-holes 4a, 4b for the fuel gas which are provided at mutually diagonal positions respectively corresponding to both sides of the catalyst electrode layer.

For example, a plurality of horizontal flow passage grooves 5a and a plurality of vertical flow passage grooves 5b, which make communication between the through-holes 2a, 2b for the oxygen-containing gas, are provided mutually perpendicularly on a first surface 1a of the separator 1 disposed opposingly to the cathode electrode. A plurality of mutually perpendicular grooves are formed on the side of a second surface of the separator 1 in order to make communication between the through-holes 3a, 3b for the heat medium. Similarly, unillustrated grooves, which extend perpendicularly in a meandering manner in the horizontal direction and in the vertical direction respectively, are also formed on the separator 1 disposed opposingly to the anode electrode in order to make communication between the through-holes 4a, 4b for the fuel gas.

When such a fuel cell is used, for example, it is demanded that the fuel cell is carried on a body of an automobile or the like. In this case, it is most practical that the fuel cell is installed under the floor of the automobile. However, if the fuel cell is installed under the floor of the automobile, it is impossible to ensure a sufficient passenger's space in a vehicle's cabin, because the height of the automobile is increased, which is not preferred. Therefore, it is necessary that the entire fuel cell is designed to have a low size in the height direction.

However, in the case of the conventional technique described above, the catalyst electrode layer is designed to have a rectangular configuration having a vertical length longer than a horizontal length. Further, the entire separator 1 is constructed to have a substantially square configuration. For this reason, the following problem is pointed out. That is, if it is intended to decrease the size in the height direction of the separator 1, the area of the catalyst electrode layer is considerably decreased. As a result, it is impossible to effectively ensure the electrode area of the stack, and it is difficult to obtain desired power generation performance, especially power generation capacity. In view of this fact, for example, it is conceived that a plurality of fuel cell stacks are arranged in an aligned manner. However, such an arrangement arises other problems in that the structure is complicated, and such an arrangement is not economic.

SUMMARY OF THE INVENTION

A principal object of the present invention is to provide a fuel cell stack in which the size in the height direction is effectively suppressed to be low and which makes it possible to reliably obtain desired power generation performance with a simple structure.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
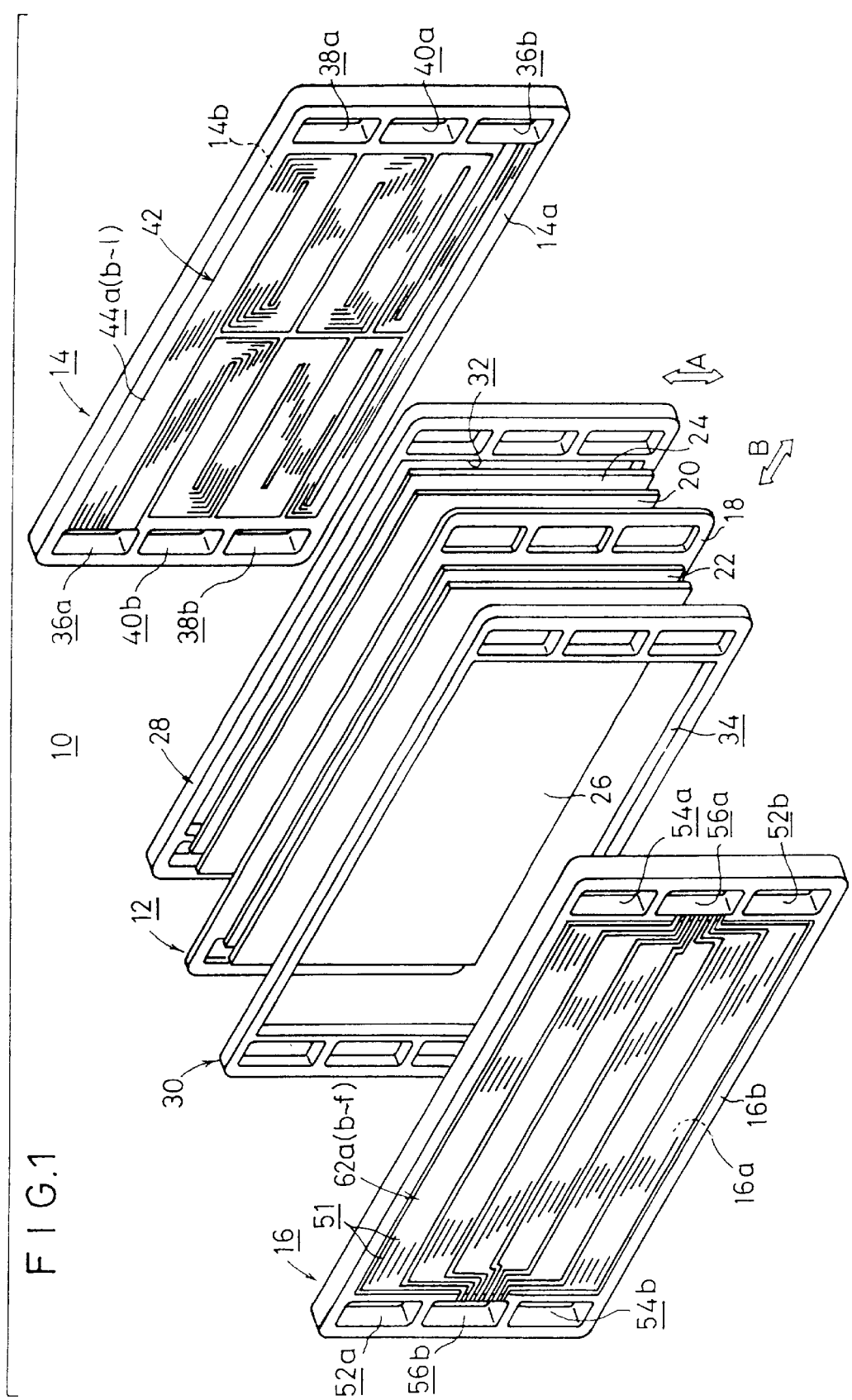
FIG. 1 shows an exploded perspective view illustrating major components of a fuel cell stack according to an embodiment of the present invention.
Figure 2:
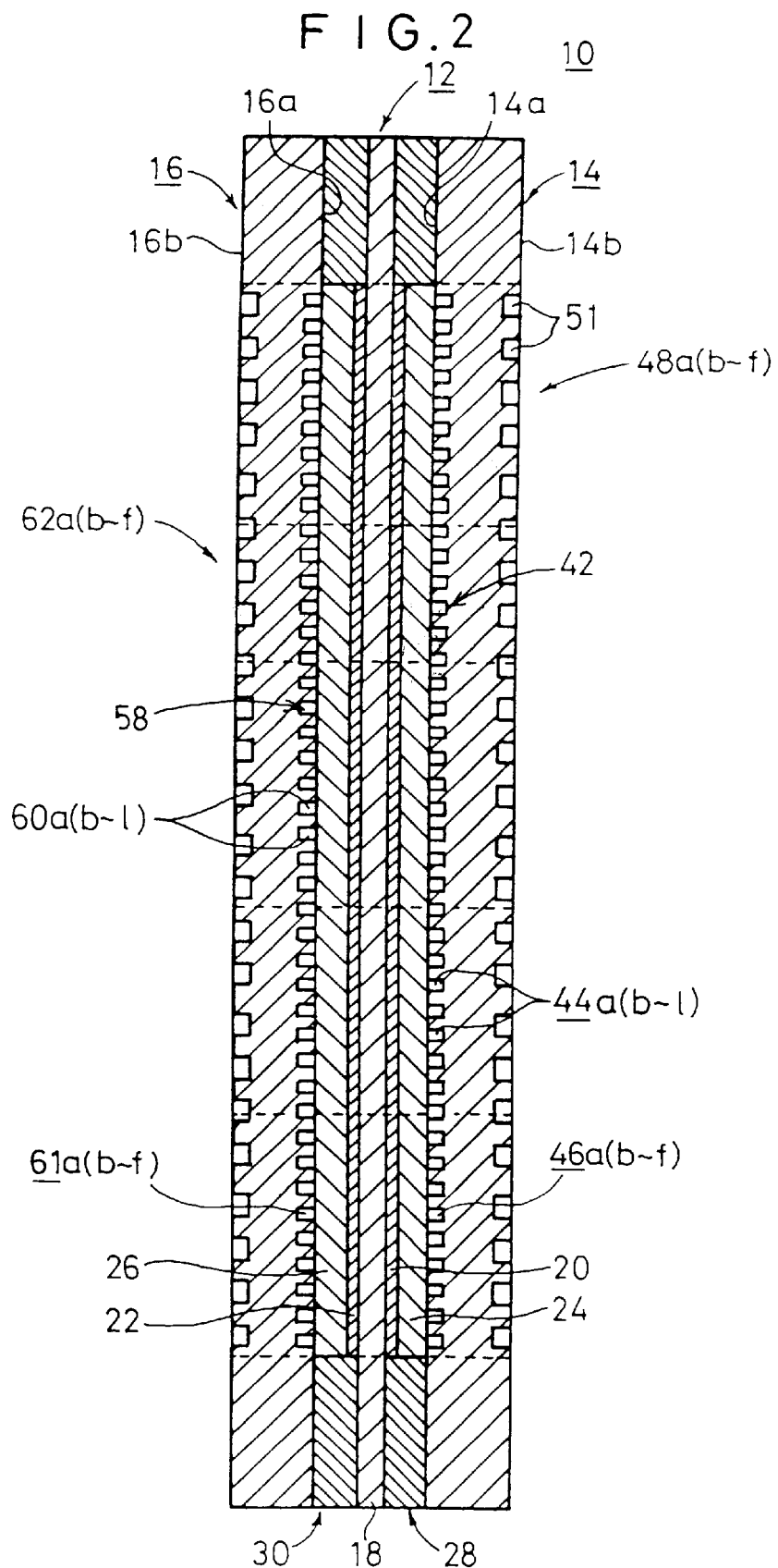
FIG. 2 shows a schematic longitudinal sectional view illustrating the fuel cell stack.

FIG. 1 shows an exploded perspective view illustrating major components of a fuel cell stack 10 according to an embodiment of the present invention, and FIG. 2 shows a schematic longitudinal sectional view illustrating the fuel cell stack 10.

The fuel cell stack 10 comprises a fuel cell unit 12, and first and second separators 14, 16 for supporting the fuel cell unit 12 interposed therebetween. A plurality of sets of these components are optionally stacked with each other. The fuel cell stack 10 has a rectangular parallelepiped-shaped configuration as a whole. For example, when the fuel cell stack 10 is carried on an automobile, it is arranged such that the short side direction (direction of the arrow A) is directed in the direction of the gravity, and the long side direction (direction of the arrow B) is directed in the horizontal direction.

The fuel cell unit 12 includes a solid polymer ion exchange membrane 18, and an anode electrode 20 and a cathode electrode 22 which are arranged with the ion exchange membrane 18 intervening therebetween. First and second gas diffusion layers 24, 26, each of which is composed of, for example, porous carbon paper as a porous layer, are arranged for the anode electrode 20 and the cathode electrode 22.

First and second gaskets 28, 30 are provided on both sides of the fuel cell unit 12. The first gasket 28 has a large opening 32 for accommodating the anode electrode 20 and the first gas diffusion layer 24. The second gasket 30 has a large opening 34 for accommodating the cathode electrode 22 and the second gas diffusion layer 26. The fuel cell unit 12 and the first and second gaskets 28, 30 are interposed between the first and second separators 14, 16.

Figure 3:
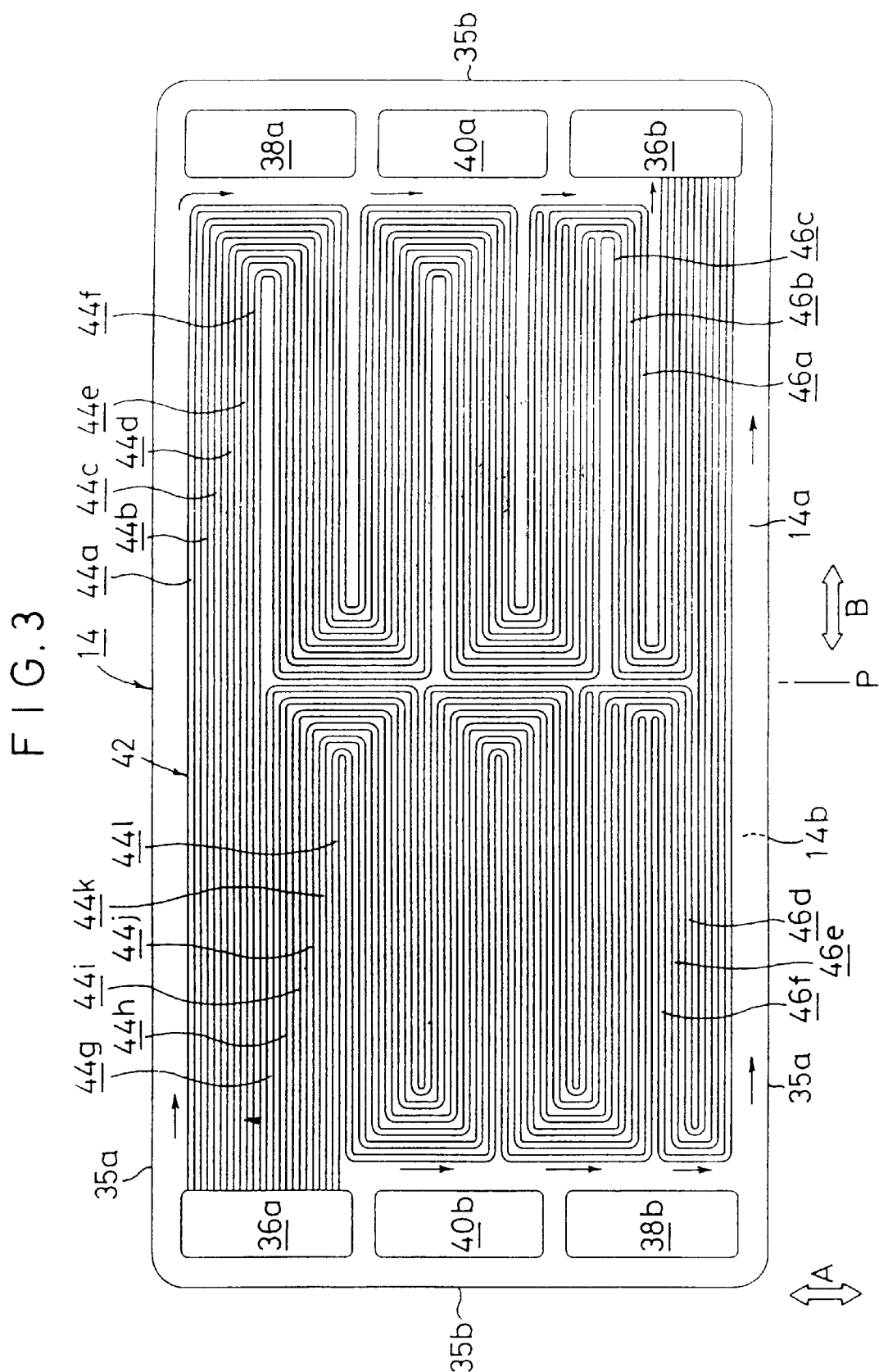
FIG. 3 shows a front view illustrating a first surface of a first separator for constructing the fuel cell stack.

As shown in FIGS. 1 and 3, the first separator 14 is designed such that each of the surface (planar surface) 14a opposed to the anode electrode 20 and the surface (planar surface) 14b on the opposite side has a rectangular configuration. When the fuel cell stack 10 is carried on the automobile, the first separator 14 is arranged such that the long side 35a is directed in the horizontal direction, and the short side 35b is directed in the direction of the gravity. The ratio of the long side 35a to the short side 35b is set, for example, to be substantially 2:1.

A fuel gas inlet 36a for allowing a fuel gas such as a hydrogen-containing gas to pass therethrough, and an oxygen-containing gas inlet 38a for allowing an oxygen-containing gas as a gas containing oxygen or air to pass therethrough are provided at upper portions at the both end edges on the short side 35b of the first separator 14. A cooling medium inlet 40a and a cooling medium outlet 40b for allowing a cooling medium such as pure water or ethylene glycol to pass therethrough are provided at central portions at the both end edges on the short side 35b of the first separator 14. A fuel gas outlet 36b and an oxygen-containing gas outlet 38b are provided at diagonal positions with respect to the fuel gas inlet 36a and the oxygen-containing gas inlet 38a respectively at lower portions at the both end edges on the short side 35b of the first separator 14.

A fuel gas flow passage (fluid passage) 42, which communicates with the fuel gas inlet 36a and the fuel gas outlet 36b, is formed on the surface 14a of the first separator 14. The fuel gas flow passage 42 includes a plurality of, for example twenty of first gas flow passage grooves 44a to 44l. First ends of the first gas flow passage grooves 44a to 44l communicate with the fuel gas inlet 36a. The first gas flow passage grooves 44a to 44l once extend in the long side direction (direction of the arrow B) of the first separator 14, and they are divided into a plurality of, for example, two of groups in the long side direction.

Specifically, the first gas flow passage grooves 44a to 44f extend from the fuel gas inlet 36a to the position in the vicinity of the oxygen-containing gas inlet 38a. On the other hand, the first gas flow passage grooves 44g to 44l extend to the position in the vicinity of a substantially central portion (hereinafter referred to as "central portion P") in the long side direction of the first separator 14. The first gas flow passage grooves 44a to 44f are provided in the direction of the gravity along a meandering configuration in which they extend in the direction of the arrow B within the right divided area in FIG. 3 from the central portion P in the surface 14a, and they turn back on the short side 35b. Each two of the first gas flow passage grooves 44a to 44f merge into one at intermediate portions to give each of second gas flow passage grooves 46a to 46c. Similarly, the second gas flow passage grooves 46a to 46c are directed in the direction of the arrow B, they turn back on the short side 35b to meander in the direction of the gravity, and then they communicate with the fuel gas outlet 36b.

The first gas flow passage grooves 44g to 44l are directed in the direction of the arrow B within the left divided area in FIG. 3 from the central portion P in the surface 14a, and they turn back on the short side 35b to meander in the direction of the gravity. Each two of the first gas flow passage grooves 44g to 44l merge into one at intermediate portions to give each of second gas flow passage grooves 46d to 46f. The second gas flow passage grooves 46d to 46f are directed in the direction of the arrow B, they turn back on the short side 35b to extend in the direction of the gravity while meandering, and they communicate with the fuel gas outlet 36b.

Figure 4:
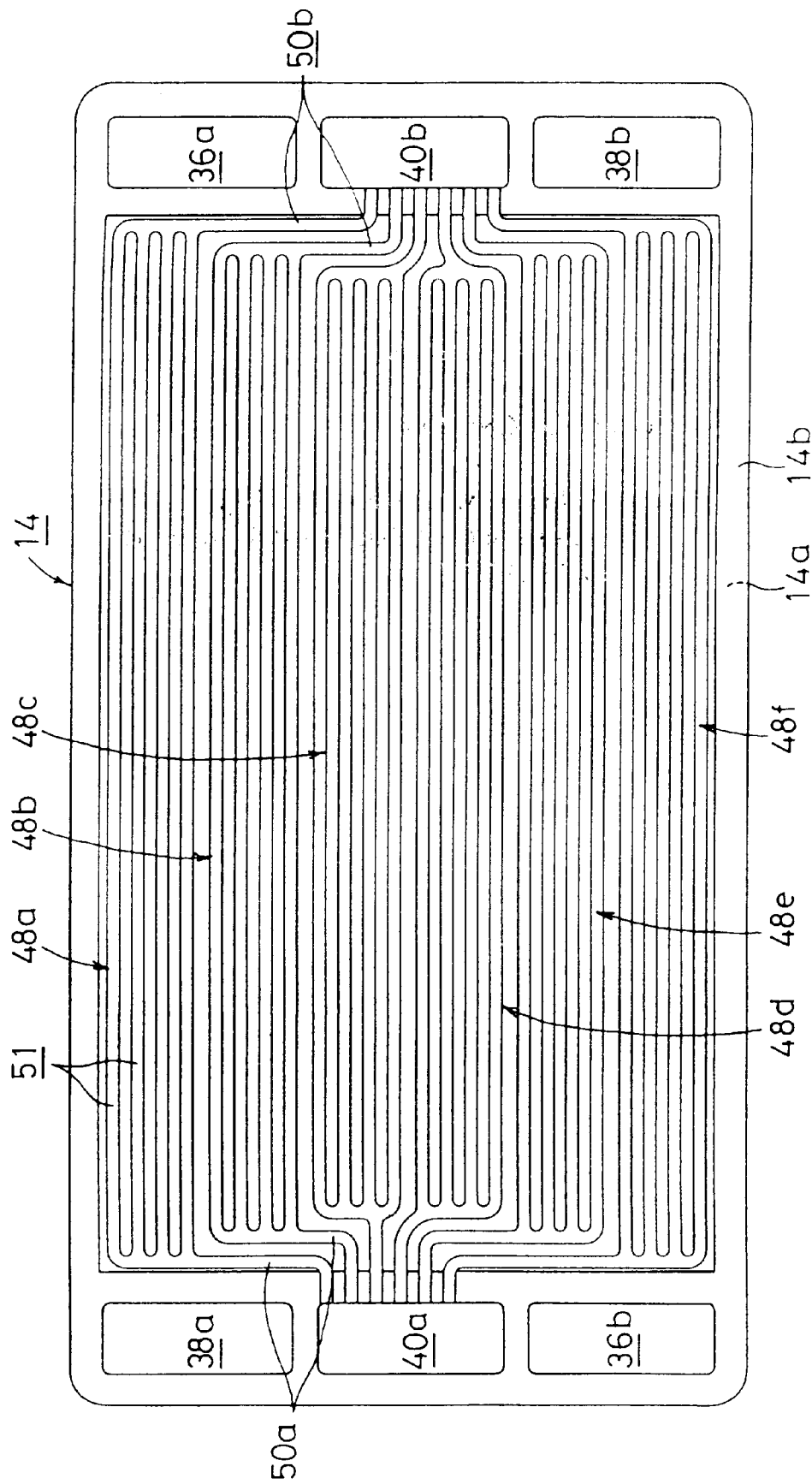
FIG. 4 shows a front view illustrating a second surface of the first separator.
Figure 5:
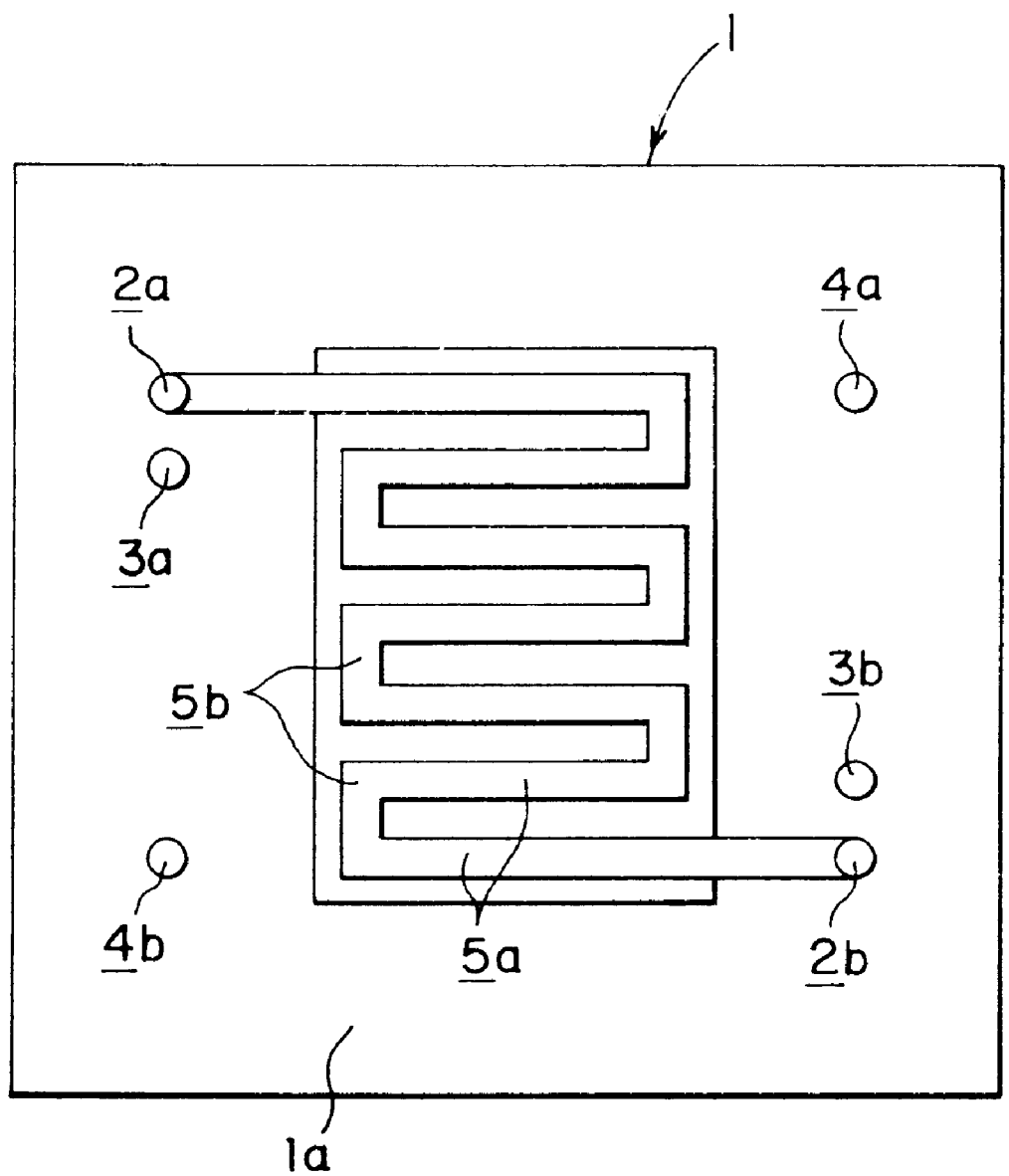
FIG. 5 shows a front view illustrating a separator for constructing a fuel cell concerning the conventional technique.

As shown in FIG. 4, cooling medium flow passages (fluid passages) 48a to 48f, which communicate with the cooling medium inlet 40a and the cooling medium outlet 40b, are provided on the surface 14b on the side opposite to the surface 14a of the separator 14. Each of the cooling medium flow passages 48a to 48f includes single main flow passage grooves 50a, 50b which communicate with the cooling medium inlet 40a and the cooling medium outlet 40b respectively, and a plurality of, for example, four of branched flow passage grooves 51 which are provided between the main flow passage grooves 50a, 50b.

As shown in FIG. 1, the second separator 16 is formed to have a rectangular configuration. A fuel gas inlet 52a and an oxygen-containing gas inlet 54a are formed to make penetration at upper portions at the both end edges on the short side of the second separator 16. A cooling medium inlet 56a and a cooling medium outlet 56b are formed to make penetration at central portions at the both end edges of the second separator 16. A fuel gas outlet 52b and an oxygen-containing gas outlet 54b are formed to make penetration at diagonal positions with respect to the fuel gas inlet 52a and the oxygen-containing gas inlet 54a respectively at lower portions at the both end edges on the short side of the second separator 16.

As shown in FIG. 2, an oxygen-containing gas flow passage (fluid passage) 58, which makes communication between the oxygen-containing gas inlet 54a and the oxygen-containing gas outlet 54b, is formed on the surface 16a of the second separator 16 opposed to the cathode electrode 22. The oxygen-containing gas flow passage 58 includes first gas flow passage grooves 60a to 60l and second gas flow passage grooves 61a to 61f in the same manner as the fuel gas flow passage 42, detailed explanation of which will be omitted.

As shown in FIG. 1, cooling medium flow passages 62a to 62f, which make communication between the cooling medium inlet 56a and the cooling medium outlet 56b, are formed on the surface 16b on the side opposite to the surface 16a of the second separator 16. The cooling medium flow passages 62a to 62f are constructed in the same manner as the cooling medium flow passages 48a to 48f which are provided for the first separator 14. The same constitutive components are designated by the same reference numerals, detailed explanation of which will be omitted.

The operation of the fuel cell stack 10 according to the embodiment of the present invention constructed as described above will be explained below.

The fuel gas (for example, reformed gas) is supplied to the inside of the fuel cell stack 10, and the air (or gas containing oxygen) as the oxygen-containing gas is supplied thereto. The fuel gas is introduced into the fuel gas flow passage 42 from the fuel gas inlet 36a of the first separator 14. As shown in FIG. 3, the fuel gas, which is supplied to the fuel gas flow passage 42, is introduced into the first gas flow passage grooves 44a to 44l, and it is moved in the direction of the gravity while meandering in the long side direction (direction of the arrow B) of the surface 14a of the first separator 14.

Specifically, the fuel gas, which is introduced into the first gas flow passage grooves 44a to 44f, flows in the long side direction up to the position in the vicinity of the oxygen-containing gas inlet 38a, it thereafter turns back on the short side 35b, it further turns back at the position in the vicinity of the central portion P of the surface 14a, and it meanders in the direction of the gravity. Accordingly, the fuel gas is moved while meandering in the direction of the gravity within the divided area of ½ of the surface 14a, it is thereafter introduced into the second gas flow passage grooves 46a to 46c, and it is fed to the fuel gas outlet 36b. During this process, the hydrogen-containing gas in the fuel gas passes through the first gas diffusion layer 24, and it is supplied to the anode electrode 20 of the fuel cell unit 12. On the other hand, the fuel gas, which is not used, passes through the second gas flow passage grooves 46a to 46c, and it is discharged from the fuel gas outlet 36b.

On the other hand, the fuel gas, which is introduced into the first gas flow passage grooves 44g to 44l, turns back at the central portion P in the surface 14a. The fuel gas flows in the long side direction (direction of the arrow B) within the divided area of ½ of the surface 14a, it turns back on the short side 35b, and it is supplied to the anode electrode 20 while meandering in the direction of the gravity. The portion of the fuel gas, which is not used, is discharged to the fuel gas outlet 36b.

In the second separator 16, the air, which is supplied from the oxygen-containing gas inlet 54a to the oxygen-containing gas flow passage 58, is moved while meandering in the direction of the gravity within the respective two-divided areas in the long side direction of the surface 16a. During this process, the oxygen-containing gas in the air is supplied from the second gas diffusion layer 26 to the cathode electrode 22 in the same manner as the fuel gas supplied to the fuel gas flow passage 42. On the other hand, the air, which is not used, is discharged from the oxygen-containing gas outlet 54b.

The cooling medium is also supplied to the fuel cell stack 10. The cooling medium is supplied to the cooling medium inlets 40a, 56a of the first and second separators 14, 16. As shown in FIG. 4, the cooling medium, which is supplied to the cooling medium inlet 40a of the first separator 14, is introduced into the respective main flow passage grooves 50a which constitute the cooling medium flow passages 48a to 48f. The cooling medium flows in the upward direction, in the horizontal direction, and in the downward direction along the main flow passage grooves 50a. The cooling medium is introduced into the plurality of branched flow passage grooves 51 branched from the respective main flow passage grooves 50a. The cooling medium flows in the horizontal direction substantially over the entire surface of the surface 14b along the branched flow passage grooves 51, it passes through the main flow passage grooves 50b into which the branched flow passage grooves 51 merge, and it is discharged from the cooling medium outlet 40b.

On the other hand, the cooling medium, which is supplied to the cooling medium inlet 56a of the second separator 16, passes through the cooling medium flow passages 62a to 62f, and it is moved linearly substantially over the entire surface of the surface 16b. After that, the cooling medium is discharged from the cooling medium outlet 56b.

In the embodiment of the present invention, as shown in FIG. 1, the fuel cell unit 12 and the first and second separators 14, 16 are designed to have the rectangular configuration. For example, the ratio of the short side to the long side is set to be about 1:2. The fuel cell stack is constructed by stacking the components with each other while allowing the short side to be directed in the direction of the gravity. The fuel cell stack 10 is carried, for example, on a body or the like of an unillustrated automobile.

Accordingly, the size in the height direction of the fuel cell stack 10 is greatly shortened. When the fuel cell stack 10 is arranged under the floor of the body, it is possible to effectively ensure the passenger's space by avoiding any increase in the height of the automobile. Further, the fuel cell unit 12 is constructed to have the long size in the horizontal direction. Therefore, an effect is obtained in that the desired power generation performance can be reliably obtained by ensuring the electrode area of the stack.

For example, the fuel gas flow passage 42, which is provided on the surface 14a of the first separator 14, is designed to have the shape to make extension in the long side direction (direction of the arrow B), turn back on the short side 35b, and meander in the direction of the gravity. Therefore, the water, which is produced in the fuel gas flow passage 42, is easily moved in the direction of the gravity. The water can be reliably discharged from the surface 14a of the first separator 14.

The fuel gas flow passage 42 has the twelve first gas flow passage grooves 44a to 44l which are divided into the groups each comprising six individuals. The first gas flow passage grooves 44a to 44f are provided in the direction of the gravity while meandering within the first divided area from the central portion P of the surface 14a. On the other hand, the first flow passage grooves 44g to 44l are provided in the direction of the gravity while meandering within the second divided area from the central portion P. Accordingly, the flow passage length is decreased to the half, as compared with the structure in which the first flow passage grooves 44a to 44l are introduced into the fuel gas outlet 36b while continuously meandering along the surface 14a. Therefore, it is possible to obtain a uniform gas concentration in the electrode surface. Thus, it is possible to effectively avoid the decrease in output density.

Further, each two of the first gas flow passage grooves 44a to 44l are merged into one at the intermediate portions to make communication with the second gas flow passage grooves 46a to 46f, and then they communicate with the fuel gas outlet 36b. Accordingly, when the fuel gas is consumed starting from the fuel gas inlet 36a toward the fuel gas outlet 36b, it is possible to avoid the decrease in the number of reactive molecules per unit area on the side of the fuel gas outlet 36b. Thus, it is possible to realize the uniform reaction over the electrode surface. In this embodiment, the thickness of the first separator 14 can be decreased, as compared with the conventional structure in which the cross sectional area of the flow passage is changed by changing the depth of the groove. Thus, it is easy to realize a small size of the entire fuel cell stack 10.

Further, the fuel gas inlet 36a, the oxygen-containing gas inlet 38a, the cooling medium inlet 40a, the fuel gas outlet 36b, the oxygen-containing gas outlet 38b, and the cooling medium outlet 40b are provided at the both end edge portions on the short side 35b of the first separator 14. Therefore, the size of the short side 35b of the first separator 14 can be effectively shortened. Thus, it is possible to design a small size in the height direction of the entire fuel cell stack 10.

In the embodiment of the present invention, the surface 14a of the first separator 14 is divided into two in the long side direction. The first gas flow passages 44a to 44f, 44g to 44l are provided within the respective divided areas. However, it is allowable that the surface 14a is divided into three or more depending on, for example, the size of the surface 14a in the long side direction. It is a matter of course that the second separator 16 may be constructed in the same manner as the first separator 14 as described above.

In the fuel cell stack according to the present invention, the planar surface of the separator is designed to have the rectangular configuration. Therefore, it is possible to set the small size in the height direction of the entire fuel cell stack. For example, the fuel cell stack can be effectively installed, for example, under the floor of the automobile body without increasing the height of the automobile. Further, the shape of the separator is long in the horizontal direction. Therefore, it is possible to ensure the sufficient electrode area of the stack with the simple structure, and it is possible to reliably obtain the desired power generation performance. Further, the fluid passage, which is provided for the separator, is designed to have the meandering configuration to extend in the long side direction in the planar surface and turn back on the short side. Therefore, the water, which is produced in the fluid passage, can be discharged to the outside smoothly and reliably.

What is claimed is:

1. A fuel cell stack comprising a plurality of fuel cell units each composed of an electrolyte interposed between an anode electrode and a cathode electrode, said plurality of fuel cell units being stacked with separators intervening therebetween, wherein:

said separator has its planar surface which is designed to have a rectangular configuration;

said planar surface is provided with a fluid passage for allowing a fluid to pass therethrough, said fluid containing one of a fluid gas to be supplied to said anode electrode and an oxygen-containing gas to be supplied to said cathode electrode;

said fluid passage is designed to have a meandering configuration extending along a lengthwise direction of said planar surface and turning back on a widthwise side of said planar surface;

said fluid passage has a plurality of flow passage grooves which make communication between a fluid inlet and a fluid outlet in said planar surface; and said flow passage grooves are divided into a plurality of serpentine flow passage groups each meandering within respective divided areas of said planar surface, said flow passage groups comprising respective serpentine patterns arranged alongside each other and oriented in a widthwise direction of said planar surface.

2. The fuel cell stack according to claim 1, wherein said separator is arranged such that said widthwise side of said planar surface is oriented in a direction of gravity when said fuel cell stack is carried on an automobile.

3. The fuel cell stack according to claim 1, wherein fluid inlets and fluid outlets for a cooling medium for cooling said fuel cell unit, said fuel gas, and said oxygen-containing gas are provided respectively at both end edge portions on said widthwise side of said separator.

4. The fuel cell stack according to claim 3, wherein said fluid passage is designed so that a flow passage cross sectional area is narrowed from said fluid inlet to said fluid outlet.

5. The fuel cell according to claim 4, wherein a number of said fluid passages decreases from said fluid inlet to said fluid outlet.

6. The fuel cell stack according to claim 1, wherein said fluid passage is designed so that a flow passage cross sectional area is narrowed from said fluid inlet to said fluid outlet.

7. The fuel cell according to claim 6, wherein a number of said fluid passages decreases from said fluid inlet to said fluid outlet.

8. A fuel cell stack comprising a plurality of fuel cell units each composed of an electrolyte interposed between an anode electrode and a cathode electrode, said plurality of fuel cell units being stacked with separators intervening therebetween, wherein:

said separator has its planar surface which is designed to have a rectangular configuration;

said planar surface is provided with a fluid passage for allowing a fluid to pass therethrough, said fluid containing one of a fluid gas to be supplied to said anode electrode and an oxygen-containing gas to be supplied to said cathode electrode;

said fluid passage is designed to have a meandering configuration extending along a lengthwise direction of said planar surface and turning back on a widthwise side of said planar surface; and fluid inlets and fluid outlets for a cooling medium for cooling said fuel cell unit, said fuel gas, and said oxygen-containing gas are provided respectively at both end edge portions on said widthwise side of said separator.

9. The fuel cell stack according to claim 8, wherein said separator is arranged such that said widthwise side of said planar surface is oriented in a direction of gravity when said fuel cell stack is carried on an automobile.

10. The fuel cell stack according to claim 8, wherein said fluid passage is designed so that a flow passage cross sectional area is narrowed from said fluid inlet to said fluid outlet.

11. The fuel cell according to claim 10, wherein a number of said fluid passages decreases from said fluid inlet to said fluid outlet.

12. The fuel cell stack according to claim 8, wherein:

said fluid passage has a plurality of flow passage grooves which make communication between a fluid inlet and a fluid outlet in said planar surface; and said flow passage grooves are divided into a plurality of groups each including a predetermined number of individuals to meander in a direction of gravity within respective divided areas.

13. The fuel cell stack according to claim 12, wherein said fluid passage is designed so that a flow passage cross sectional area is narrowed from said fluid inlet to said fluid outlet.

14. The fuel cell according to claim 13, wherein a number of said fluid passages decreases from said fluid inlet to said fluid outlet.

* * * * *